(12) United States Patent
Kibler (10) Patent No.: US 9,315,136 B2
(45) Date of Patent: Apr. 19, 2016

(54) DUMP TRAILER

(71) Applicant: MAC TRAILER MANUFACTURING, INC., Alliance, OH (US)

(72) Inventor: Scott A. Kibler, Kensington, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 0 days.

(21) Appl. No.: 13/954,512

(22) Filed: Jul. 30, 2013

(65) Prior Publication Data
US 2015/0035314 A1    Feb. 5, 2015

(51) Int. Cl.
*B60P 1/28*           (2006.01)

(52) U.S. Cl.
CPC ........................................ *B60P 1/28* (2013.01)

(58) Field of Classification Search
CPC ................ B60P 1/04; B60P 1/16; B60P 1/26; B60P 1/273; B60P 1/28
USPC ......... 298/17 R, 19 R, 22 R, 23 R; 296/183.2
See application file for complete search history.

(56) References Cited

U.S. PATENT DOCUMENTS

| | | | | | |
|---|---|---|---|---|---|
| 1,883,936 | A | * | 10/1932 | Kerr | B60P 1/24 298/17 R |
| 3,003,818 | A | * | 10/1961 | Merchant | B60P 1/18 298/17.5 |
| 3,093,254 | A | * | 6/1963 | Sammarco | |
| 3,844,616 | A | * | 10/1974 | Acker | B60P 1/286 298/22 D |
| 4,058,343 | A | * | 11/1977 | Maxon, III | 298/9 |
| 5,460,431 | A | * | 10/1995 | McWilliams | 298/22 AE |
| 6,854,789 | B2 | * | 2/2005 | Kloepfer | 296/183.2 |

\* cited by examiner

*Primary Examiner* — Stephen Gordon
(74) *Attorney, Agent, or Firm* — Sand & Sebolt (57) ABSTRACT

A dump trailer comprising a U-shaped trailer body having a bottom wall and opposing side walls. The trailer includes a curved front wall and a pivotable tailgate. The front wall is U-shaped when viewed from the top and angles upwardly and forwardly from the bottom wall. A support structure provided adjacent the front wall operatively engages hitch and lift assemblies. The support structure includes spaced-apart supports secured to the front wall; and spaced-apart horizontal beams secured to the supports. The beams extend through apertures in the front wall and into the compartment. This enables the trailer body to be lowered relative to the ground, thus lowering the center of gravity of the trailer. A wheel assembly mounts to the rear end of the trailer via a mounting plate curved complementary to the bottom wall. Cut-outs in the plate reduce the overall weight of the trailer.

16 Claims, 9 Drawing Sheets

DUMP TRAILER

BACKGROUND OF THE INVENTION

1. Technical Field

This invention is directed to trucks. More particularly, this invention is directed to dump trucks which include a tractor and trailer. Specifically, the invention is related to an improved dump trailer which has an arcuate front end, is constructed so that the center of gravity of the truck is kept as low to the ground as possible; and includes a reduced weight rear mounting plate which reduces the overall weight of the trailer so that it is capable of carrying loads of commensurate increased weight.

2. Background Information

Some of the issues in the trucking industry are how to fabricate trucks and trailers in such a manner that they are more economical to run and are able to operate in as safe a fashion as possible. This is particularly of interest in the dump truck field as traditional dump trailers are box-shaped and therefore present a front wall that resists airflow. This resistance tends to create increased drag on the trailer during operation and therefore requires additional energy to be expended to move the vehicle down the road. The increase in required energy drives the cost of operation upward because of the need for additional fuel to power the tractor.

Still further, trailer bodies are utilized to carry different types and sizes of loads. The load may shift within the bed during travel and this may affect the center of gravity of the vehicle, making it slightly unstable. This center of gravity issue is also problematic during dumping as the higher the center of gravity of the trailer, the more care which has to be expended during dumping of the load to prevent the trailer from tipping over as the load slides down the bed.

There is therefore a need in the art for an improved dump trailer and a truck incorporating the same which addresses some or all of these issues.

SUMMARY

A dump trailer comprising a U-shaped trailer body having a bottom wall and opposing side walls is disclosed. The trailer includes a curved front wall and a pivotable tailgate. The front wall is U-shaped when viewed from the top and angles upwardly and forwardly away from the bottom wall. The curvature of the trailer body and the front wall makes the trailer more aerodynamic and thus reduces drag as the trailer moves. This in turn results in a lower fuel consumption for the tractor pulling the trailer.

A support structure provided adjacent the front wall operatively engages hitch and lift assemblies. The support structure includes spaced-apart supports secured to the front wall; and spaced-apart horizontal beams secured proximate the bottom of the supports. The beams extend through apertures in the front wall and into the compartment. The placement of these beams within the interior of the compartment enables the hitch assembly to be positioned closer to the trailer body's bottom wall and thus enables the entire trailer body to be lowered relative to the ground. The lowering of the position of the trailer body results in a lower center of gravity for the vehicle, thereby making it both more aerodynamic and stable. A wheel assembly mounts to the rear end of the trailer via a mounting plate. The mounting plate is curved in a manner complementary to the bottom wall of the trailer. Cut-outs in the plate reduce the overall weight of the trailer and this translates to a reduction in the overall weight of the truck. The reduction in truck weight means that the weight of the load that may be carried in the trailer can be increased in proportion to the reduction in weight of the mounting plate.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

Similar numbers refer to similar parts throughout the drawings.

DETAILED DESCRIPTION

Referring to FIGS. 1-9, there is shown a truck 10 having a tractor 12 and including a trailer 14 in accordance with the present invention. Truck 10 preferably is a dump truck. Tractor 12 includes a cab 12a that is disposed on a frame 12b. A portion of the frame 12b extends rearwardly from cab 12a. Several sets of wheels 16 are mounted on frame 12b. A slip-plate 18 is mounted on an upper surface of the portion of frame 12b that extends rearwardly from cab 12a and is configured to engage a hitch assembly, such as hitch assembly 26, on a trailer.

Trailer 14 includes a trailer body 20, a wheel assembly 22, a landing gear assembly 24, a hitch assembly 26 (FIG. 2), and a lift assembly 28. Landing gear assembly 24, hitch assembly 26 and lift assembly 28 may be of any suitable type known in the art.

Figure 3:
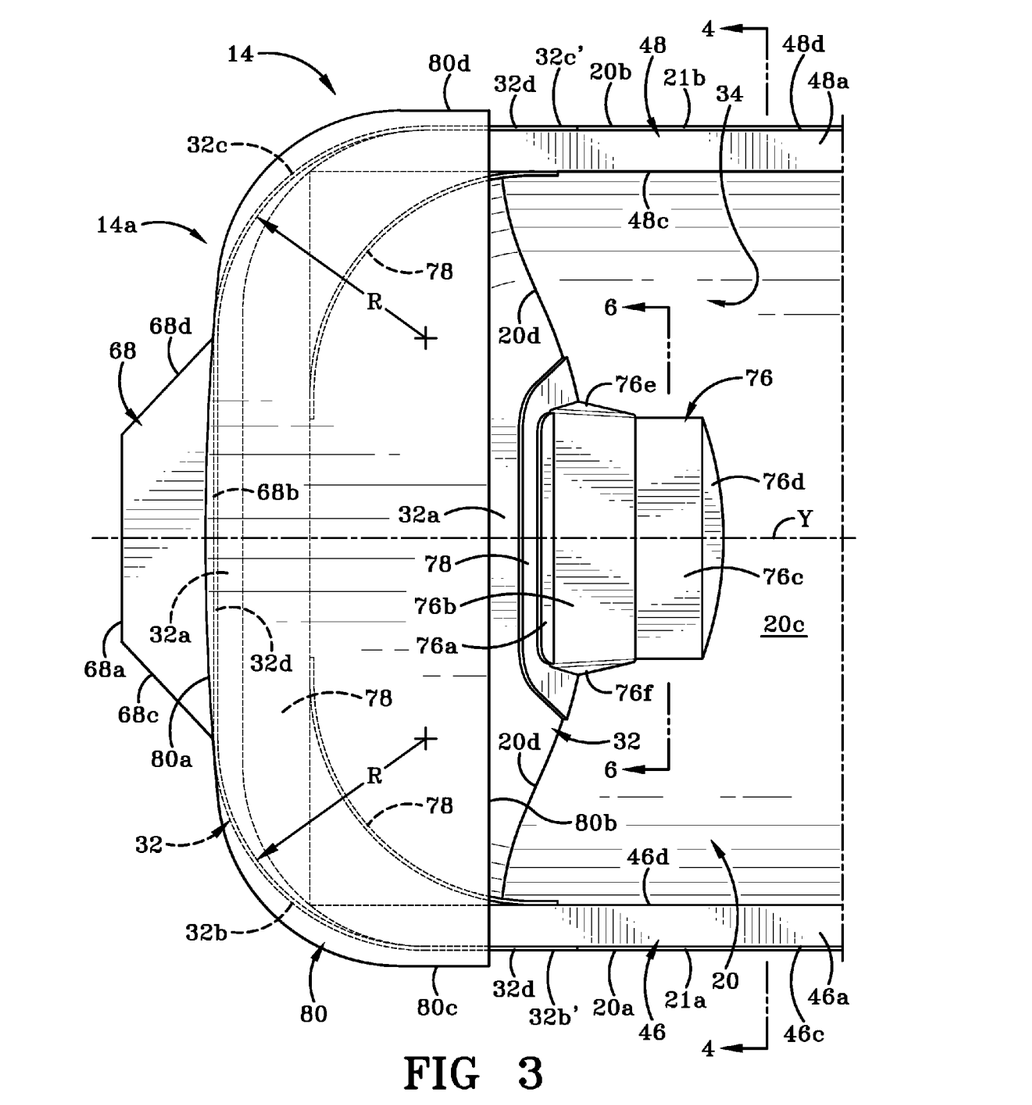
FIG. 3 is a top view of the front end of the dump trailer shown in FIG. 2.

Trailer body 20 is arcuate in cross-sectional shape and includes a peripheral wall that is U-shaped or semi-circular when viewed from the rear (as shown in FIG. 3). The U-shaped body 20 forms left and right side walls 20a, 20b, and a bottom wall 20c. Left and right side walls 20a, 20b and bottom wall 20c of trailer body 20 are substantially continuous with each other and form the semi-circular shape of trailer body 20. Because of this curved shape of body 20, the body 20 is substantially free of corner regions that may include at least one planar wall. Dump trailer 14 is engaged with tractor 12 such that a front end 14a of trailer 14 is adjacent cab 12a and a rear end 14b of trailer 14 is remote therefrom. Trailer 14 defines a longitudinal axis that extends between front and rear ends 14a, 14b and is designated by reference character "Y" in FIG. 3. The U-shaped body 20 allows for a more streamlined airflow over the left and right side walls 20a, 20b and under bottom wall 20c than has been the case in previously known trailer bodies. This more streamlined airflow reduces the drag on the trailer making it more aerodynamic and therefore tractor 12 requires less energy to move trailer 14 over a roadway "G".

Trailer body 20 further includes a tailgate 30 at the rear end 14b and a front wall 32 at front end 14a. Left and right side walls 20a, 20b are generally parallel to longitudinal axis "Y", and tailgate 30 and front wall 32 are generally perpendicular to longitudinal axis "Y". Left and right side walls 20a, 20b and bottom wall 20c form a peripheral wall which, together with tailgate 30 and front wall 32, bounds and defines an interior compartment 34. Compartment 34 is configured to retain a load (not shown) therein. Preferably, dump trailer 14 is an open-topped dump trailer and the load is introduced into compartment 34 through an opening defined between the top edges 21a, 21b (FIG. 2) of left and right side walls 20a, 20b, and top ends of tailgate 30 and front wall 32. It will be understood however, that the aerodynamic features and weight reducing features of trailer 14, which will be discussed further herein, may be incorporated into closed-top dump trailers as well.

Wheel assembly 22 is engaged with rear end 14b of trailer 14. Wheel assembly 22 includes one or more sets of wheels 36, a suspension assembly (not shown), braking system (not shown) and other components well known in the art.

Figure 8:
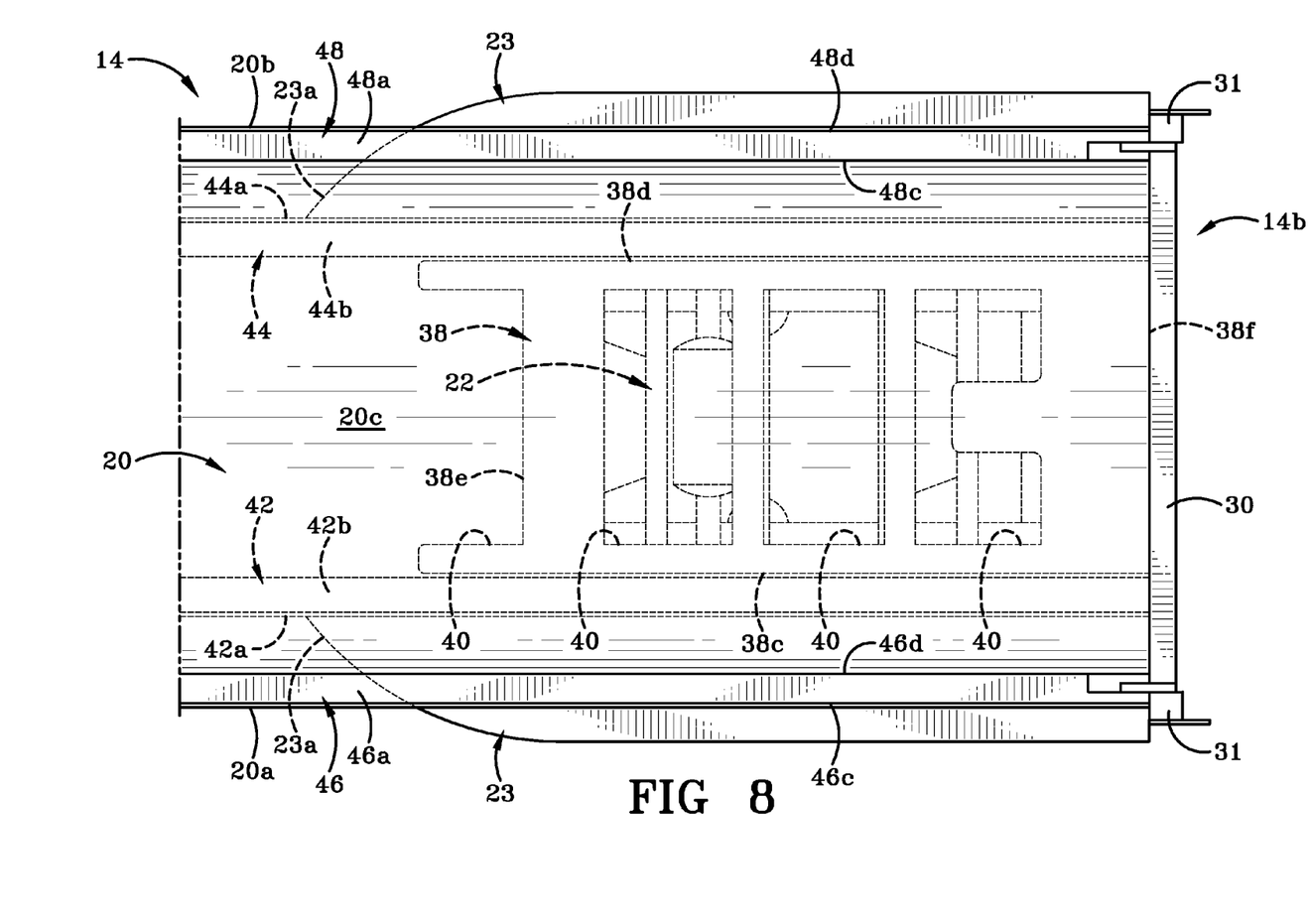
FIG. 8 is a top view of the back end of the dump trailer showing the mounting plate which secures the wheel assembly to the trailer drawn in phantom.
Figure 9:
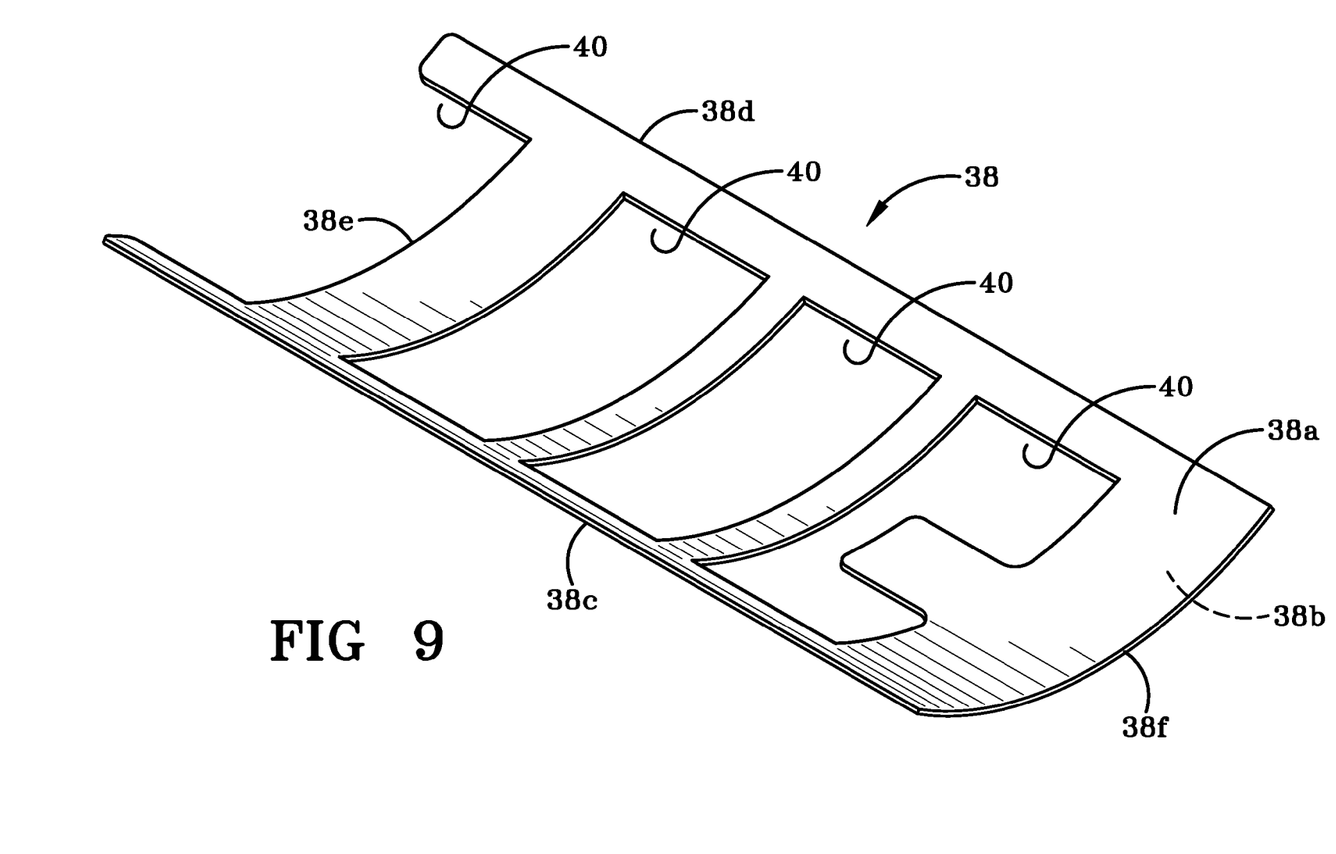
FIG. 9 is a perspective view of the mounting plate removed from the dump trailer to show the cutout regions therein.

In accordance with one aspect of the invention, dump trailer 14 preferably includes a mounting plate 38 (FIGS. 1, 8 & 9) that is welded or otherwise secured to an exterior surface of bottom wall 20c of trailer body 20. Mounting plate 38 is arcuate in shape and is complementary in curvature to the curvature of bottom wall 20c. Previously known trailers have included a system of I-beams that extend from one end of the trailer body to the other to support the wheel assembly. Mounting plate 38 in accordance with the present trailer 10 has an upper surface 38a, a lower surface 38b, a left side edge 38c, a right side edge 38d, a front edge 38e and a rear edge 38f. Mounting plate 38 acts to reinforce and strengthen rear end 14b of trailer 14 and provide a strong-enough region for wheel assembly 22 to be secured thereto. Fenders 23 are provided on either side of mounting plate 38 to direct water away from wheel assembly 22. Each fender 23 is arcuate in profile when viewed from behind the truck 10 and this not only aids in directing water downwardly toward a roadway "G" (FIG. 1) but also aids to generate less turbulent airflow around the rear end 14b of trailer 14. As is illustrated in FIG. 8, the leading edge 23a of each fender 23 is also curved to direct air toward the rear end 14b of trailer 14 to streamline airflow around the same.

In accordance with one aspect of the trailer 14, mounting plate 38 further defines one or more cut-outs 40 therein. Cut-outs 40 are provided to reduce the overall weight of mounting plate 38. It will be understood that the number and size of cut-outs 40 has to be balanced with the strength requirements for mounting plate 38. The configuration of mounting plate 38 illustrated has resulted in the overall weight of the trailer being reduced by around 600 lbs over previously known trailer designs. This reduction in overall weight has two substantial benefits. Firstly, a lighter weight trailer will require less fuel to be consumed in order to move the trailer 14 over roadway "G". Reduction in weight is also advantageous because additional load can be carried in trailer 14. The 600 lbs of weight removed from the structure of the trailer 14 itself can be replaced with 600 lbs of load.

In previously known designs, the I-beams and braces used to strengthen the trailer body and support the wheel assembly have run the entire length of the trailer body and are especially present toward the rear end of the trailer body. These I-beams and braces have greatly added to the overall weight of previously known trailers and have therefore required additional fuel to be expended to move the vehicle and have limited the load that can be carried quite substantially. Furthermore, these I-beams and braces have increased the turbulence in the air flowing around the trailer while it is moving as they have extended for a distance beneath the bottom wall of the trailer body. In accordance with an aspect of trailer 14, the positioning and curvature of mounting plate 38 leads to a more laminar airflow around the back end of the truck 10, i.e., more streamlined airflow. The more laminar airflow generated by the curved mounting plate 38 again leads to a reduction in the drag on trailer 14 and therefore to a reduction in the quantity of fuel consumed by truck 10.

As indicated previously, upper surface 38a of mounting plate 38 in trailer 14 is disposed adjacent the exterior surface of bottom wall 20c of trailer body 20. It will be understood that instead of positioning mounting plate 38 beneath the exterior surface of bottom wall 20c, it could be positioned above interior surface thereof. This latter position is somewhat less desirable as it could interfere with dumping of a load from trailer 14 unless some type of shielding is provided but it would likely lead to benefits in airflow about trailer 14 being even more streamlined.

Tailgate 30 is mounted by way of support brackets 31 (FIG. 8) between the rear ends of first and second side walls 20a, 20b so as to obstruct an opening (not shown) between the side walls. Support brackets 31 enable tailgate 30 to pivot out of alignment with the back ends of side walls 20a, 20b when front end 14a of trailer 14 is raised by lift assembly 28. This enables a load (not shown) carried in compartment 34 to slide out of compartment 34 through the opening during a dumping operation. When the load has been dumped, front end 14a of trailer 14 is lowered by lift assembly 28 and tailgate 30 will then pivot back into alignment with the back ends of side walls 20a, 20b. A locking assembly (not shown) is typically provided to keep tailgate 30 in a closed position when not actively used for dumping. It will be understood tailgate 30 may be mounted to pivot around either of a horizontal axis or a vertical axis.

In accordance with yet another feature of the trailer 14, a pair of first rails 42, 44 is provided on trailer body 20 and these rails extend from a bottom end of front wall 32 to tailgate 30. First rails 42, 44 are disposed on either side of the bottom wall region 20c and a short distance upwardly along each of the respective left and right side walls 20a, 20b (see FIG. 2). First rail 42 is generally L-shaped in cross-section and includes a vertical first leg 42a and a horizontal second leg 42b. Second rail 44 is also generally L-shaped in cross section and includes a vertical first leg 44a and a horizontal second leg 44b. First rails 42, 44 preferably are welded to the exterior surface of body 20 at the ends of each of the first and second legs thereof. It will be understood that first rails 42, 44 may be secured by other means to trailer body 20, such as by fasteners. First rails 42, 44 aid in strengthening and supporting trailer body 20. It should be noted, with reference to FIG. 8, that mounting plate 38 extends across the region of bottom wall 20c between first rail 42 and first rail 44. If desirable, mounting plate 38 may be welded or otherwise secured to first rails 42, 44, although this is not illustrated herein. Welding first rails 42, 44 to mounting plate further adds strength to rear end 14b of trailer 14.

A set of second rails 46, 48 (FIG. 4) is provided proximate a top end of trailer body 20 and these second rails extend from proximate front wall 32 to proximate tailgate 30. Second rails 46, 48 provide strength and rigidity to the upper regions of each of the first and second side walls 20a, 20b, respectively.

Preferably, each second beam 46, 48 is welded to an interior surface of trailer body 20. It will be understood, however, that first and second beams may be secured to trailer body 20 by other means, such as by fasteners.

Each of the second rails 46, 48 is generally rectangular in cross-section. Second rail 46 includes an upper surface 46a, a lower surface 46b, a first side surface 46c and a second side surface 46d. Similarly, second rail 48 includes an upper surface 48a, a lower surface 48b, a first side surface 48c, and a second side surface 48d. Second rails 46, 48 are horizontally aligned with each other and extend generally parallel to longitudinal axis "Y" of trailer body 20. Second rail 46 is positioned adjacent an interior surface of first side wall 20a such that upper surface 46a is substantially horizontally aligned with upper edge 21a of first side wall 20a. Similarly, second rail 48 is positioned adjacent an interior surface of second side wall 20b such that upper surface 48a is substantially horizontally aligned with upper edge 21b of second side wall 20b. Thus, upper edge 21a and upper surface 46a constitute the upper end of first side wall 20a and upper edge 21b and upper surface 48a constitute the upper end of second side wall 20b. The positioning of the second rails 46, 48 is therefore essentially inside compartment 34. This is yet another feature of trailer 14 which enables a more laminar airflow to occur, thereby reducing drag and lowering fuel consumption of the truck 10. In previously known dump trailers it has been common to have strengthening beams or rails welded to the exterior surface of the trailer front and side walls and to the tailgate as well.

Figure 1:
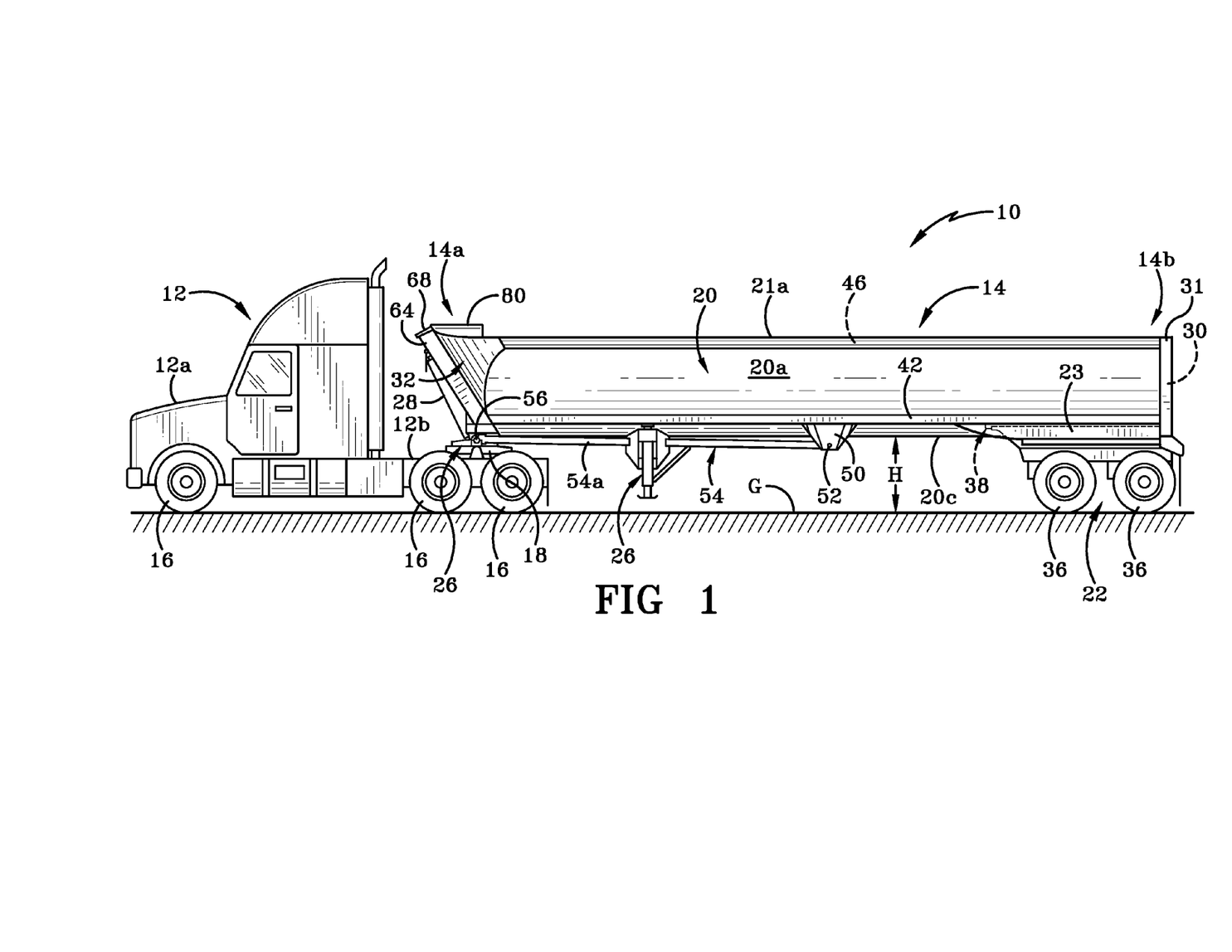
FIG. 1 is a side view of a dump truck showing the improved dump trailer.

As shown in FIG. 1 a first mounting plate 50 is welded or otherwise secured to a region of first rail 42 approximately mid-way between front end 14a and rear end 14b of trailer 14. First mounting plate 50 extends downwardly from first rail 42 for a distance beneath bottom wall 20c of trailer body 20. Similarly, although not shown herein, a second mounting plate is welded or otherwise secured to first rail 44 in a location laterally aligned with first mounting plate 50. A pivot pin 52 extends between the two mounting plates and an arm assembly 54 is pivotally engaged with pin 52. Arm assembly 54 includes a first arm 54a and a second arm 54b (FIG. 4) which engage and support landing gear assembly 24 a distance forwardly of the mounting plates. Landing gear assembly 24 may be any suitable known type of landing gear and is configured to operate in a known manner.

Figure 2:
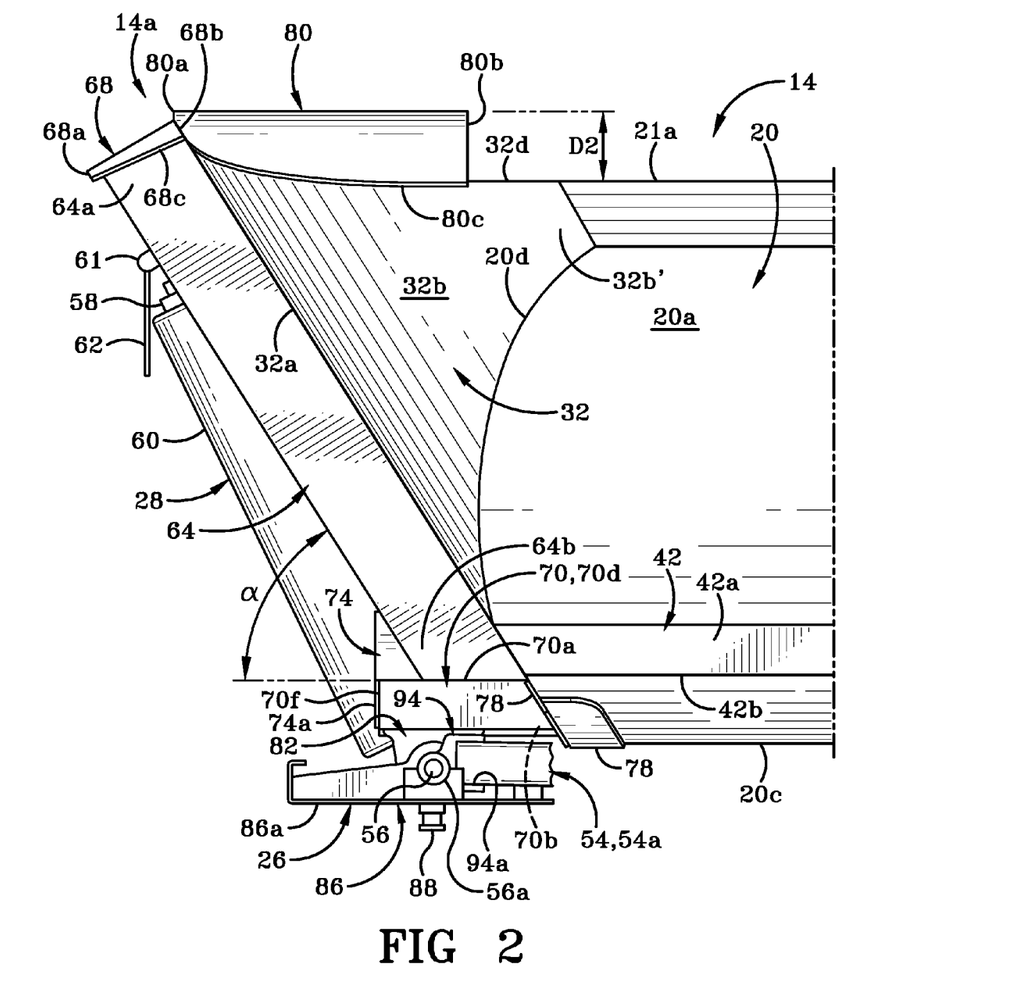
FIG. 2 is an enlarged left side view of the front end of the dump trailer.
Figure 5:
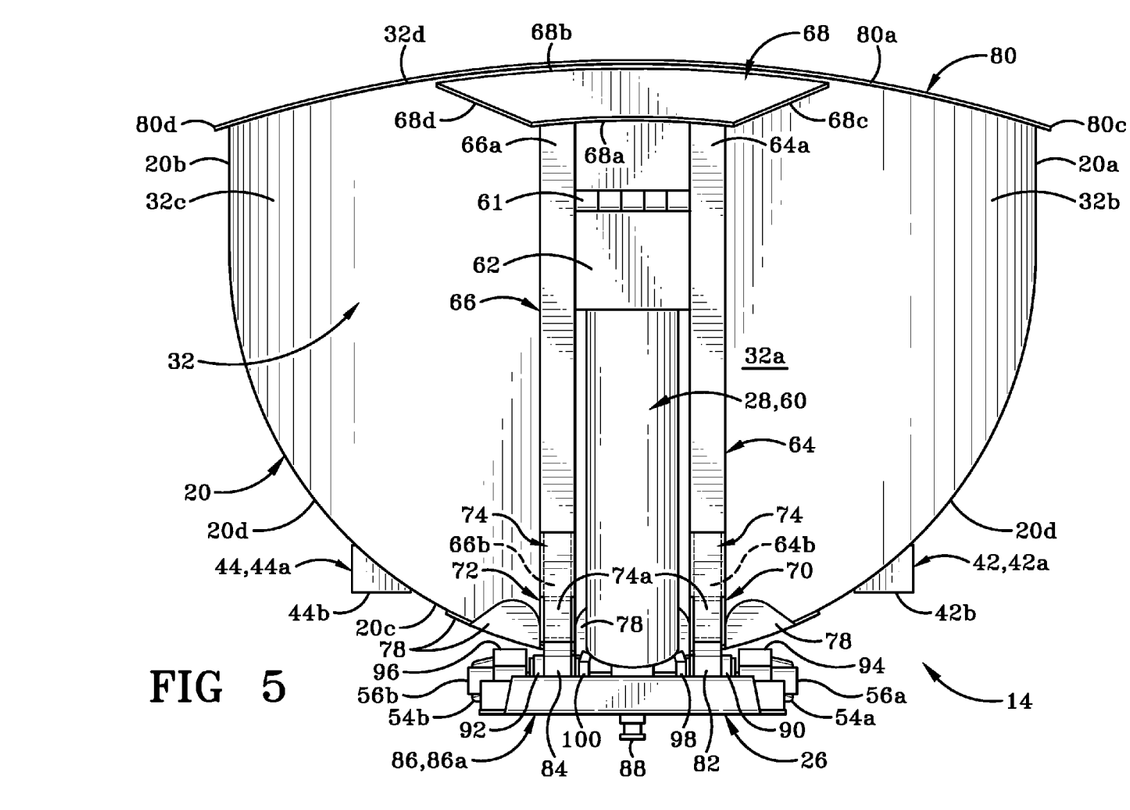
FIG. 5 is a front plan view of the front end of the dump trailer shown in FIG. 3.

The front ends of each of the first and second arms 54a, 54b remote from pivot pin 52 is engaged with hitch assembly 26 and lifting assembly 28 via a pivot rod 56, as is shown in FIGS. 2 & 5. Hitch assembly 26 will be described later herein. Lifting assembly 28 is any suitable known type of lifting assembly which includes a piston 58 and cylinder 60. The lifting assembly 28 may be pneumatic or hydraulic in operation but is typically hydraulic.

In accordance with an aspect of the dump trailer 10, front wall 32 is curved and is generally U-shaped (FIG. 3) when viewed from above. Front wall 32 includes a generally flattened central region 32a and curved first and second regions 32b, 32c. Central region 32a is disposed substantially at right angles to longitudinal axis "Y" of dump trailer 10 and the side regions 32b, 32c curve rearwardly away from central region 32a. In accordance with an aspect of dump trailer 10, central region 32a angles upwardly and forwardly from bottom wall 20c of trailer body 20 at an angle α. Angle α is an angle other than 90® and preferably is in the range of from about 50° up to about 75°. More particularly, angle α is about 60°. Thus, the top edge 32d of front wall 32 is spaced a greater distance from tailgate 30 than is the bottom edge (not numbered) of front wall 32.

Curved first region 32b of front wall 32 extends outwardly and laterally from the central region 32a in a first direction and subsequently curves through about 90 degrees. At least an upper portion 32b' thereof (FIGS. 2 & 3) becomes substantially aligned with first side wall 20a and is secured thereto, preferably by welding. Curved second region 32c extends outwardly and laterally from the central region 32a in a second direction and subsequently curves through about 90 degrees (i.e., opposite the curvature of first region 32b); and at least an upper portion 32c' thereof becomes substantially aligned with second side wall 20b and is secured thereto. Each of the curved first and second regions 32b, 32c has a radius of curvature "R" (FIG. 3) of from about 18 inches up to about 22 inches.

Front wall 32 is welded to body 20 along curved edge 20d of body 20. Preferably, first and second side regions 32b, 32c of front wall 32 are welded to curved edge 20d of first and second side walls 20a, 20b in such a way that the weld itself does not extend much beyond the exterior surfaces of front wall 32 and side walls 20a, 20b. The lower the profile of the weld, the better the airflow over front wall 32 and side walls 20a, 20b. The curvature of front wall 32 is such that as truck 10 travels over the roadways the airflow is caused to be as laminar as possible. Substantially all of the welds on trailer 14 are made in the same fashion so that the do not tend to project for much of a distance outwardly beyond the exterior surface of trailer 14. This assists in creating an improved airflow around trailer 14 Additionally, the curvature of front end 20d of each side wall 20a, 20b toward the rear end 14b of trailer 14 is positioned and configured to direct airflow toward rear end 14b of trailer 14 and thereby disturb airflow as little as possible and possibly even guide airflow in a particular fashion.

Dump trailer 14 also includes a supporting structure for hitch assembly 26 and lift assembly 28. This supporting structure includes but is not limited to, a pair of supports 64, 66 (FIGS. 2, 5 and 6) and a pair of beams 70, 72. Supports 64, 66 extend generally vertically along the exterior surface of central region 32a of front wall 32 and provide strength and rigidity thereto. Each beam 70, 72 is secured to a bottom end of one of the supports 64, 66 and extends substantially horizontally into compartment 34 as will be described hereafter. Hitch assembly 26 and lift assembly 28 are operatively engaged with beams 70, 72.

Each support 64, 66 is generally tubular and is substantially rectangular in cross-section, with four walls (not numbered) bounding and defining a central bore (not shown). Preferably, the outside corners (not numbered) of support 64, 66 are rounded to enable as laminar an airflow as possible over the same. Supports 64, 66 are each open at a top end 64a, 66a (FIG. 5) and at a bottom end 64b, 66b. Because front wall 32 angles upwardly and forwardly away from bottom wall 20c, top ends 64a, 66a of beams 64, 66 are spaced a greater distance from tailgate 30 than are the bottom ends 64b, 66b thereof.

Preferably, piston 58 and cylinder 60 of lifting assembly 28 are positioned between the interior surfaces of supports 64, 66 as is shown in FIG. 5. A flap 62 is engaged with supports 64, 66 via a hinge 61 which extends between interior surfaces of supports 64 and 66. Flap 62 hangs downwardly to cover the upper end of piston 58 and cylinder 60 in order to protect the same and to stop debris and the like from entering cylinder 60. Flap 62 may be pivoted outwardly away from front wall 32 to gain access to piston 58 for maintenance purposes.

A cover plate 68 is engaged with front wall 32 and extends downwardly from a top region thereof to extend across the open upper ends 64a, 66a of supports 64, 66. Cover plate 68 prevents air from flowing into and through the bores of supports 64, 66 and also prevents debris and water from entering the same. Cover plate 68 is narrower at a front end 68a and wider at a rear end 68b. Additionally, side edges 68c, 68d flare outwardly away from front end 68a toward rear end 68b. This configuration aids in directly airflow toward and over a top end of trailer 14. It will be understood that two individual cover plates may alternatively be provided in the place of plate 68. Each individual plate would be smaller than plate 68 and cover one of the upper ends 64a, 66a.

In accordance with yet another aspect of dump trailer 14, a pair of horizontal beams 70, 72 (FIGS. 2, 6, and 7) are provided adjacent bottom ends 64b, 66b of supports 64, 66, respectively. Bottom ends 64b, 66b of supports 64, 66 preferably are welded to portions of beams 70, 72, respectively. Beams 70, 72 thus strengthen and support front end 14a of trailer 14 so that it is able to withstand the forces generate during lifting and lowering of front end 14a by way of lifting assembly 28.

In accordance with a further aspect of trailer 14, part of each of the beams 70, 72 is disposed outside of compartment 34 of trailer 14 and part of each of the beams 70, 72 is disposed inside of compartment 34. In previously known dump trailers, all support beams for the front end of the trailer and for the trailer hitch assembly have been disposed outside of the trailer compartment and have been positioned beneath the bottom wall of the trailer body. In trailer 14, on the other hand, the beams 70, 72 are positioned partially, substantially or entirely above bottom wall 20c of trailer 14. Thus, hitch assembly 26 is able to be mounted closer proximity to the underside of bottom wall 20c than was possible in previously known dump trailers. This effectively increases the clearance between the roadway "G" and bottom wall 20c. Because of this increased clearance, the body 20 of trailer 14 is able to be effectively moved downward, closer to roadway "G. In particular, this reconfiguration of the support structure enables trailer body 20 to be lowered a distance of from about 5 inches up to about 8 inches closer to roadway "G" when compared with previously known dump trailers. Thus, bottom wall 20c is positioned at a lower height "H" relative to roadway "G" than was previously possible. This lowering in the height of trailer body 20 results trailer 14 having a lower center of gravity than previously known dump trailers and is thus more stable. Furthermore, reducing the distance between bottom wall 20c and roadway "G" also causes air to flow differently around, over and below trailer 14. Specifically, reducing the relative height "H" between bottom wall 20c and roadway "G" tends to generate fewer eddies and turbulence in the airflow. Thus, the drag on the trailer 14 is substantially reduced. Because the drag is reduced, less power is required to drive truck 10 forwardly over roadway "G", and thus, the amount of gasoline required to operate truck 10 is greatly reduced.

Figure 6:
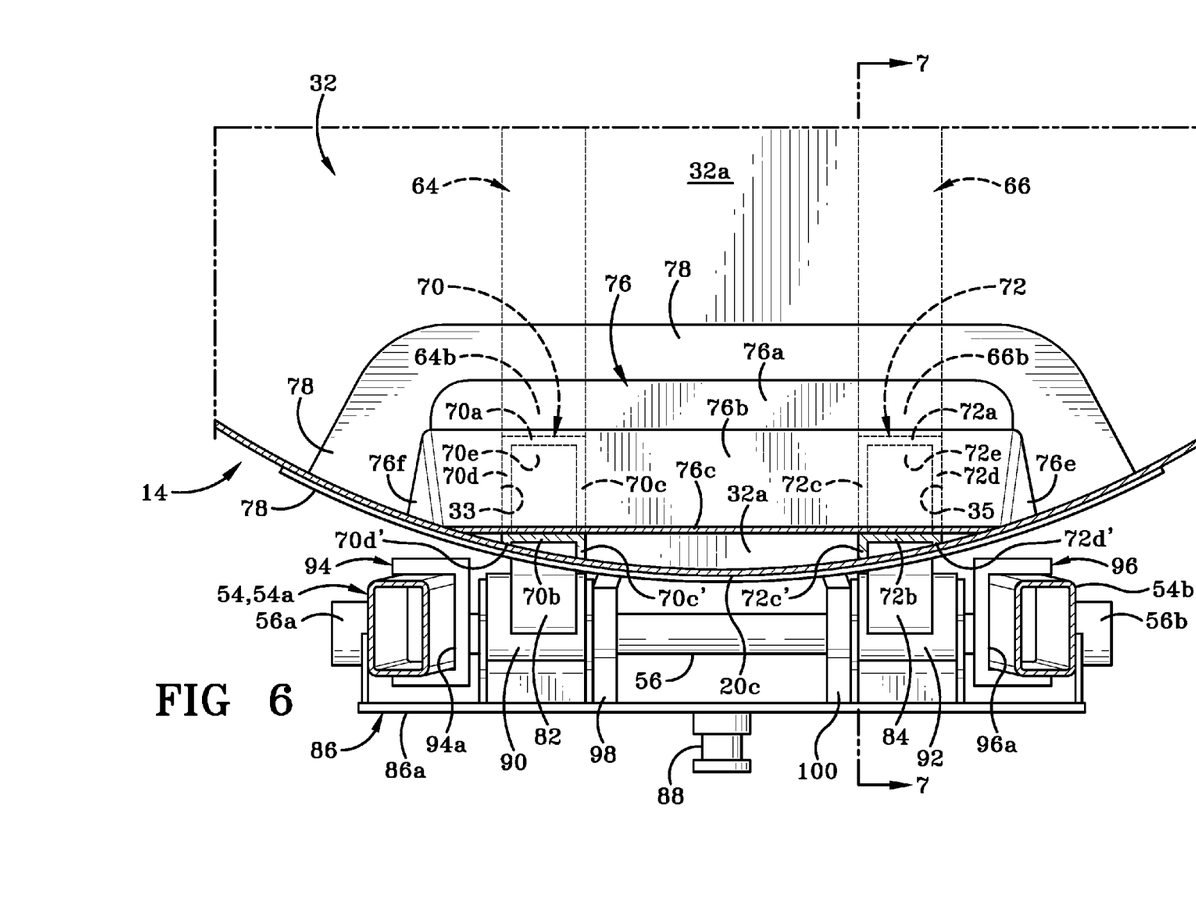
FIG. 6 is a rear view of the front end of the dump trailer taken along line 6-6 of FIG. 3.

FIG. 6 shows that beam 70 includes a top wall 70a, a bottom wall 70b, a first side wall 70c, a second side wall 70d. A portion 70c of the first side wall 70c extends for a distance beyond bottom wall 70b as does a portion 70d' of the second side wall 70d. The portion 70c' of the first side wall 70c is longer than the portion 70d' of the second side wall 70d. Similarly, beam 72 includes a top wall 72a, a bottom wall 72b, a first side wall 72c, and a second side wall 72d. A portion 72c' of the first side wall 72c extends for a distance beyond bottom wall 72b as does a portion 72d' of the second side wall 72d, and the portion 72c' of the first side wall 72c is longer than the portion 72d' of the second side wall 72d. Beam 70 defines an interior bore 70e and beam 72 defines an interior bore 72e.

Thus, beams 70, 72 are each tubular and hollow and have a generally rectangular cross sectional shape when viewed from the front end.

Figure 7:
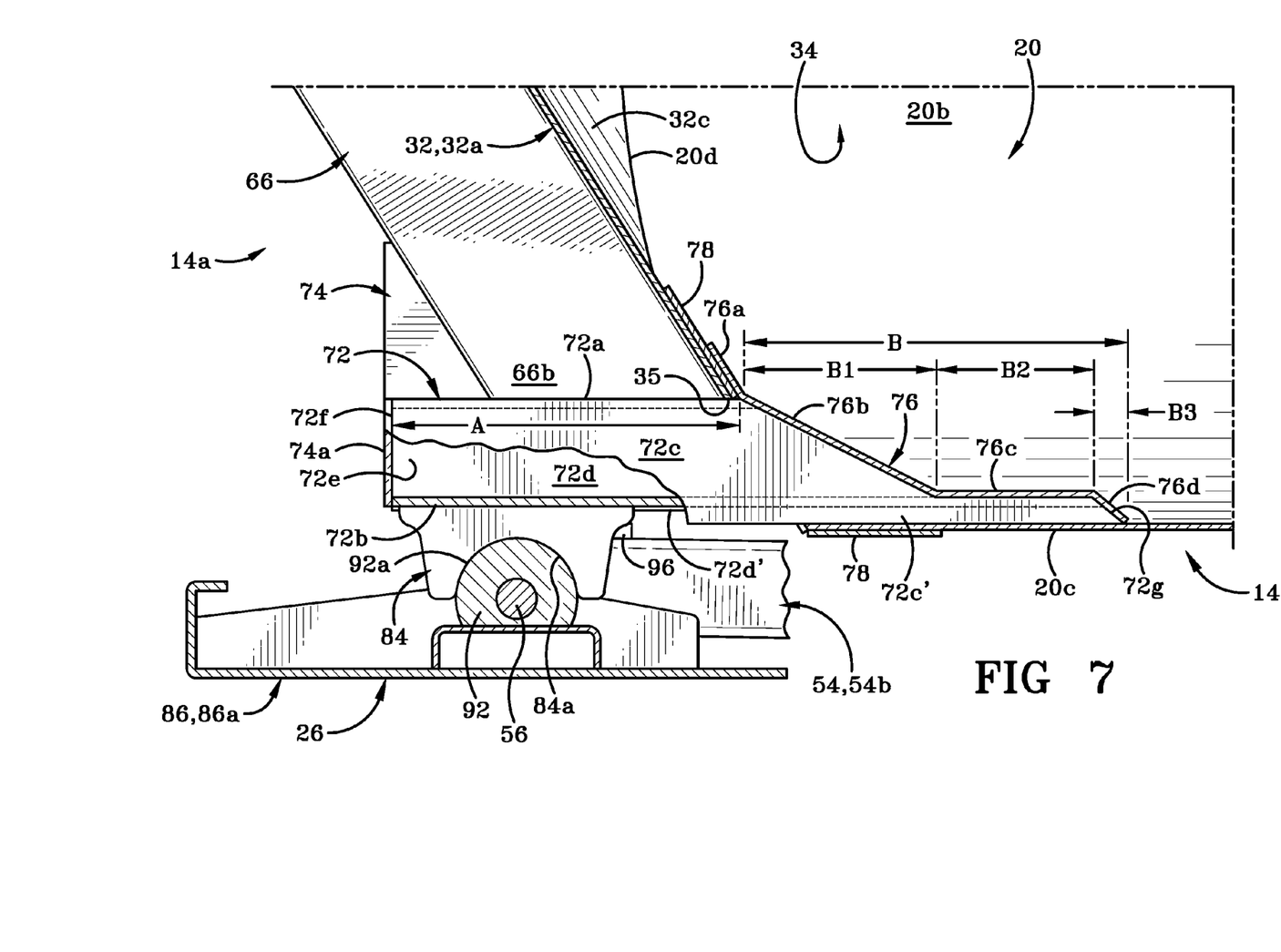
FIG. 7 is left side view of the front end of the dump trailer taken along line 7-7 of FIG. 6 with the lift assembly removed for the sake of clarity.

Referring to FIG. 7, beam 72 has a first end 72f and a second end 72g and both ends are open. A buttress 74 is disposed on the upper surface of top wall 72a of beam 72 proximate first end 72f and extends upwardly to strengthen support 66. Buttress 74 includes a plate-like flange 74a which extends downwardly from a front face of buttress 74 in front of first end 72f of beam 72. Flange 74a closes off access to bore 72e of beam 72 and thereby prevents air from flowing through bore 72e. A substantially identical buttress is provided on beam 70 to underpin support 64, and a flange blocks off access to the bore 70e of beam 70.

First end 72f of beam 72 is generally rectangular in cross-sectional shape and is disposed outside of the front wall 32 of trailer 10. Beam 72 extends for a distance from flange 74a to where beam 72 enters through an aperture 35 (FIG. 6) defined between front wall 32 and second side wall 20b of trailer body 20. The portion of beam 72 which is disposed outside of trailer body 20 is identified by the reference character "A" in FIG. 7. The rest of beam 72 is disposed within the interior compartment 34 of trailer body 20 and is identified by the reference character "B" in FIG. 7. The region "B" includes an angled first region "B1" where the top wall 72a of beam 72 is absent and a top edge of each of the first and second side walls 72c, 72d angle downwardly toward bottom wall 72b and rearwardly toward second end 72g. The region "B" further includes a generally horizontal second region "B2" where the top edge of the first and second side walls 72c, 72d is disposed generally parallel to bottom wall 72b. Region "B" further includes an angled third region "B3" where the top edge of first and second side walls 72c, 72d angles downwardly and rearwardly to meet bottom wall 72b.

Beam 70 is similarly configured to beam 72 and a first portion thereof is disposed outside of the front wall 32 and a second portion thereof is disposed inside of compartment 34, entering through an aperture 33 (FIG. 6) that is spaced apart from aperture 35 in front wall 32. Because each of beams 70, 72 is a hollow member, having bores 70e, 72e therein, an angled plate 76 is provided to close off access to bores 70e, 72e at the second ends of beams 70, 72 which are disposed inside compartment 34. (This stops any of the material of a load carried in compartment 34 from entering bores 70e, 72e. Plate 76 is configured to simultaneously block access to both bores 70e, 72e at the same time. (It will be understood however, that two smaller plates could alternatively be utilized to separately block access to the bore of each of the two beams.) Plate 76 includes a plurality of angled surfaces 76a, 76b, 76c, 76d (FIGS. 3 & 6) which are angled complementary to a portion of the interior of front wall 32, and the angled regions "B1", "B2", and "B3", respectively. Plate 76 also includes opposed side flaps 76e, 76f (FIG. 3) which extend downwardly from surfaces 76a and 76b to ensure water and debris cannot enter bores 70e and 72e of beams 70, 72. The angled surfaces are also provided to ensure that any load carried in compartment 34 slides easily off cover plate 76 when trailer body 20 is tipped to dump a load carried therein.

Beams 70, 72 do not run the entire length of trailer 14 from front end 14a to rear end 14b. Instead, beams 70, 72 terminate a short distance away from front end 14a. Preferably, beams 70, 72 are in the order of two to three feet in overall length. The members of the support structure provided adjacent front wall 32 are preferably welded to each other but they may, alternatively, be secured by other suitable means, such as by way of fasteners.

It should also be noted that the front end 14a of trailer 14 is provided with several reinforcing plates which strengthen and support various regions of the structure. All of these reinforcing plates are identified in the figures by the reference character 78. It will be understood that there may be fewer or additional reinforcing plates included in trailer 14 from what is illustrated in the attached figures. Furthermore, any of the reinforcing plates 78 may be differently configured from what is illustrated herein.

Figure 4:
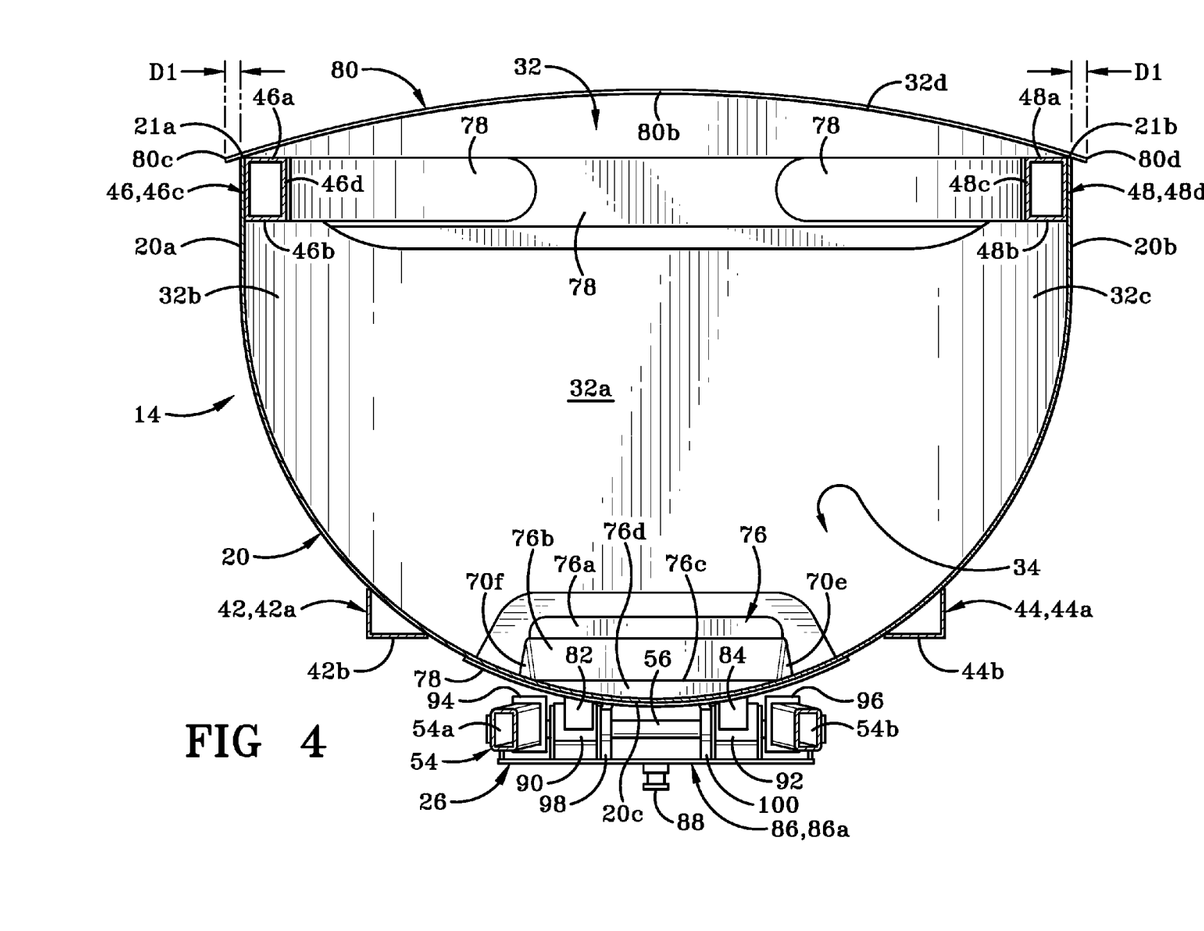
FIG. 4 is a rear view of the front end of the dump trailer taken along line 4-4 of FIG. 3.

In accordance with another aspect of the invention, a shield 80 is provided at front end 14a of trailer 14. As shown in FIGS. 3-5, shield 80 is an arcuate plate which has a front 80a, a rear 80b, and sides 80c, 80d. Shield 80 is welded to upper edge 32d of wall 32 so that there are substantially no gaps between them through which air will flow. FIG. 4 shows that shield 80 is convex in shape when viewed from the rear and edges 80c, 80d are disposed a short distance "D1" outwardly beyond an exterior surface of each of curved regions 32b, 32c. "D1" is approximately 2 inches long. Shield 80 also extends for a distance "D2" (FIG. 2) above edges 21a, 21b of first and second side walls 20a, 20b of trailer body 20. "D2" is approximately 8 inches long. The shield's configuration and placement helps direct airflow over the top edge of dump trailer 14 in such a fashion that it is more laminar than would be the case if shield 80 was not provided. This, once again, reduces drag on trailer 14 as it moves over roadway "G". The more laminar airflow is also helpful in reducing the likelihood that small particles of load material will become entrained in the air flowing over the open-topped trailer 14 and damage vehicles traveling behind trailer 14.

The support structure further includes a generally U-shaped foot 82 (FIG. 2) which extends outwardly and downwardly from bottom wall 70b of beam 70. FIG. 7 shows that a substantially identical U-shaped foot 84 extends outwardly and downwardly from a bottom wall 72b of beam 72. Feet 82 and 84 are laterally aligned with each other and spaced a lateral distance apart. Foot 84 includes a U-shaped curved surface 84a (FIG. 7). Foot 82 includes a substantially identical curved surface (not numbered) which is laterally aligned with surface 84a. Feet 82, 84 are welded to their associated beams 70, 72 and therefore move in unison therewith. When dump trailer 14 is raised by way of cylinder 60 to dump a load therefrom, beams 70, 72 and their associated feet 82, 84 move upwardly away from hitch assembly 26. When dump trailer 14 is lowered by way of cylinder 60, beams 70, 72 and their associated feet 82, 84 move back toward hitch assembly 26 and become operatively engaged therewith.

Hitch assembly 26 includes a hitch plate 86, hitch pin 88, the pivot rod 56, a pair of spaced apart seat members 90, 92, a pair of reinforcing caps 94, 96, and a pair of alignment plates 98, 100. (Other components may form part of hitch assembly 26 but only these listed components are illustrated in the attached figures. As shown in FIG. 6, hitch plate 86 includes at least a first section 86a which is disposed substantially horizontally. Seat members 90, 92 are welded to first section 86a of hitch plate 86 a distance apart from each other and extend upwardly away therefrom. Seat members 90, 92 are laterally aligned with each other. Alignment plates 98, 199 are also welded to first section 86a of hitch plate 86 and extend upwardly therefrom. Arms 54a, 54b extend forwardly from landing gear 24 and through apertures 94a and 96a in the respective reinforcing caps 94, 96. Pivot rod 56 extends through aligned holes (not shown) through reinforcing cap 94, arm 54a, seat 90, plate 98, seat 92, cap 96, and arm 54b. End caps 56a, 56b are provided on pivot rod 56 to keep it engaged with the other components of hitch assembly 26. Hitch pin 88 extends downwardly from first section 86a of hitch plate 86 and is available for engagement with slip plate 18 of tractor 12 as is known in the art.

FIG. 7 shows that seat 92 includes a convexly shaped exterior surface 92a that is complementary in curvature and size to concavely-shaped surface 84a of foot 84. It should be noted that seat 90 also includes a similar convexly shaped exterior surface that is complementary to the curvature and size of the U-shaped surface on foot 82. When trailer bed 14 is in is lowered position (shown in FIG. 1), foot 84 of the support structure is operatively engaged with seat 92 of hitch assembly 26 as shown in FIG. 7; and foot 82 is operatively engaged with seat 90 as shown in FIG. 2. The weight of the front end 14a of trailer 14 keeps the feet 82, 84 engaged with seats 90, 92. Although not illustrated herein, it will be understood that hitch assembly 26 may, alternatively, include some type of locking mechanism for retaining the engagement between feet 82, 84 and seats 90, 92. Plates 98, 100 help to ensure that the associated feet 82, 84 and seats 90, 92 are correctly aligned for proper engagement when trailer bed 14 is being lowered. FIG. 5 shows that lift assembly 28 is also operatively engaged with hitch assembly 26. Specifically, lower end 60a of cylinder 60 is operatively engaged with pivot rod 56.

Dump truck 10 is used to move loads in substantially the same manner as previously known dump trucks. The aerodynamic design of truck 10 in the provision of the curved front wall 32, unitary U-shaped and curved trailer body 20, along with the lowered center of gravity by virtue of the inclusion of at least some of the support structure for hinge assembly 26 being raised relative to the bottom wall 20c of trailer body 20 and inserted at least partially into the interior compartment 34 of trailer body 20, all contribute to truck 10 being more fuel efficient. In addition to these features, the inclusion of a supporting structure for wheel assembly 22 which comprises a lighter-weight, more aerodynamic mounting plate 38 instead of heavier I-beams which increase drag, also contributes to the improved fuel efficiency of truck 10. Furthermore, the reduction in overall weight of dump truck 10 because of the inclusion of mounting plate 38 makes it possible for the truck 10 to carry additional load, thus improving the trucking company's bottom line.

It will be understood that the hitch assembly 26, lift assembly 28, and landing gear 24 are used in any manner already known in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:
1. A dump trailer comprising:
   a trailer body having a bottom wall and two opposing side walls that are disposed substantially parallel to a longitudinal axis extending between a front end and a rear end of the trailer body;
   a front wall extending between the two side walls at the front end of the trailer body; wherein the front wall and side walls of the trailer body each have an upper edge; and wherein the front wall is arcuate when viewed from a lateral side of the trailer body and includes:
      a peripheral edge which connects to each of the two side walls and to the bottom wall; and an area bounded and defined by the peripheral edge and extending between the two side walls; and wherein the area is curved;
a tailgate pivotally mounted to at least one of the side walls at the rear end of the trailer body;
a compartment defined and bounded by the trailer body, the front wall and the tailgate, said compartment being adapted to carry a load therein; and
a shield extending rearwardly from the upper edge of the front wall and towards the tailgate and from the upper edge of a first one of the side walls to the upper edge of the other of the side walls; said shield terminating a distance away from the tailgate; and wherein the shield is arcuate when viewed from the rear end of the trailer.

2. The dump trailer as defined in claim 1, wherein the shield is a metal shield that is welded to the upper edges of the front wall and the side walls.

3. The dump trailer as defined in claim 1, wherein the shield is convex in shape.

4. The dump trailer as defined in claim 1, wherein the shield extends for a distance outwardly beyond one or both of the side walls of the trailer body.

5. The dump trailer as defined in claim 1, wherein the shield is welded to the upper edges of the front wall and side walls in such a manner that there are substantially no gaps between the shield and the upper edges of the front and side walls through which air will flow.

6. A dump trailer comprising:
a trailer body having a bottom wall and two opposing side walls that are disposed substantially parallel to a longitudinal axis extending between a front end and a rear end of the trailer body;
a front wall extending between the two side walls at the front end of the trailer body; wherein the front wall is arcuate when viewed from a lateral side of the trailer body and includes:
a peripheral edge which connects to each of the two side walls and to the bottom wall; and
an area bounded and defined by the peripheral edge and extending between the two side walls; and wherein the area is curved;
a tailgate pivotally mounted to at least one of the side walls at the rear end of the trailer body; and
a compartment defined and bounded by the trailer body, the front wall and the tailgate, said compartment being adapted to carry a load therein; and
wherein the front wall is secured to each of the side walls along a curved edge and, when the trailer is viewed from the lateral side, the curved edge originates proximate the bottom wall and angles forwardly therefrom for a first distance; then arcs rearwardly toward the tailgate of the trailer for a second distance; and then angles forwardly toward the front end for a third distance.

7. The dump trailer as defined in claim 6, wherein the front wall is disposed generally perpendicular to the longitudinal axis and is generally U-shaped when viewed from above.

8. The dump trailer as defined in claim 6, wherein the area of the front wall includes a central region flanked by two side regions; and wherein the central region is generally planar and the two side regions are curved in opposite directions to each other.

9. The dump trailer as defined in claim 8, where an exterior front surface of the central region is inclined at an angle other than 90 degrees relative to the bottom wall of the trailer body.

10. The dump trailer as defined in claim 9, wherein the angle of incline of the central region surface is from about 50 degrees up to about 75 degrees.

11. The dump trailer as defined in claim 9, wherein the central region has an upper edge and a lower edge, where the lower edge connects to the bottom wall; and wherein the upper edge of the central region is longitudinally displaced relative to the lower edge thereof.

12. The dump trailer as defined in claim 11, wherein the upper edge of the central region is located a greater distance from a rear wall of the trailer than is the lower edge of the central region.

13. The dump trailer as defined in claim 6, wherein the area of the front wall bounded by the peripheral edge is oriented at an angle transverse to the longitudinal axis of the trailer.

14. The dump trailer as defined in claim 6, wherein the area of the front wall bounded by the peripheral edge is generally convex in shape.

15. The dump trailer as defined in claim 6, wherein the peripheral edge of the front wall is convex in shape.

16. The dump trailer as defined in claim 6, further comprising a strengthening rail provided inwardly of an upper edge of each of the side walls; each rail extending between the front wall and the tailgate of the trailer body.

* * * * *